(12) United States Patent
Riezler et al.

(10) Patent No.: US 7,613,664 B2
(45) Date of Patent: Nov. 3, 2009

(54) SYSTEMS AND METHODS FOR DETERMINING USER INTERESTS

(75) Inventors: Stefan Riezler, San Francisco, CA (US); Daniel H. Greene, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 401 days.

(21) Appl. No.: 11/096,344

(22) Filed: Mar. 31, 2005

(65) Prior Publication Data

US 2006/0224552 A1    Oct. 5, 2006

(51) Int. Cl.
*G06E 1/00*    (2006.01)
*G06E 3/00*    (2006.01)

(52) U.S. Cl. ............... 706/16; 707/5; 707/10; 707/101; 715/700

(58) Field of Classification Search ........... 706/16, 706/14, 20, 48; 707/3, 4; 345/440
See application file for complete search history.

(56) References Cited

U.S. PATENT DOCUMENTS

| | | | |
|---|---|---|---|
| 7,031,961 B2 * | 4/2006 | Pitkow et al. | 707/10 |
| 2002/0016786 A1 * | 2/2002 | Pitkow et al. | 707/3 |
| 2002/0152213 A1 * | 10/2002 | Barrett et al. | 707/10 |
| 2004/0230415 A1 | 11/2004 | Riezler et al. | |
| 2005/0055321 A1 * | 3/2005 | Fratkina et al. | 706/45 |
| 2006/0116860 A1 | 6/2006 | Kaplan et al. | |
| 2006/0116861 A1 | 6/2006 | Kaplan et al. | |
| 2006/0136385 A1 | 6/2006 | Bobrow et al. | |

OTHER PUBLICATIONS

Riezler, S., King, T., Crouch, R., Zaenen, A., "Statistical Condensation using Ambiguity Packing and Stochastic Disambiguation Methods for Lexical-Functional Grammar", in Proceedings of the HLT-NAACL'03, Edmonton, Canada 2003.
Riezler, S., Vasserman, A., "Incremental Feature Selection and L1 Regularization for Relaxed Maximum Entropy Modeling", in Proceedings of the Conference on Empirical Methods in Natural Langauge Processing (EMNLP'04), Barcelona, Spain, 2004.
U.S. Appl. No. 10/999,793, R. Kaplan et al.
U.S. Appl. No. 10/999,792, R. Kaplan et al.
U.S. Appl. No. 10/017,890, D. Bobrow et al.

* cited by examiner

*Primary Examiner*—David R Vincent
*Assistant Examiner*—Kalpana Bharadwaj
(74) *Attorney, Agent, or Firm*—Fay Sharpe, LLP

(57) ABSTRACT

Techniques are provided to determine user-interest features and user-interest parameter weights for a user-interest model. The user-interest features are pre-determined and/or determined dynamically. Pre-determined user-interest features are based on user-interest profiles, prior user activities, documents listed in a resume, reading or browsing patterns and the like. Dynamically determined user-interest features include features learned from an archive of user activities using statistical analysis, machine learning and the like. User-interest parameter weights are pre-determined and/or dynamically determined. Pre-determined user-interest parameter weights include parameter weights manually entered by a user indicating the relevant importance of a user-interest feature and parameter weights previously learned from an archive of the user's past activities. Dynamically assigned user-interest parameter weights include dynamically determined updates to user-interest parameter weights based on newly identified documents or topics of interest.

4 Claims, 8 Drawing Sheets

SYSTEMS AND METHODS FOR DETERMINING USER INTERESTS

INCORPORATION BY REFERENCE

The following co-pending applications:
"Systems and Methods for User-Interest Sensitive Note-Taking" by R. KAPLAN et al., filed Nov. 30, 2004, as U.S. application Ser. No. 10/999,793;
"Systems and Methods for User-Interest Sensitive Condensation" by R. KAPLAN et al., filed Nov. 30, 2004, as U.S. application Ser. No. 10/999,792;
"Systems and Methods for Using and Constructing User Sensitive Indicators of Search Results" by D. BOBROW et al., filed Dec. 21, 2004, as U.S. application Ser. No. 11/017,890;
"Systems and Methods for Grammatical Text Condensation" by S. RIEZLER et al., filed May 12, 2003, as U.S. application Ser. No. 10/435,036; are each incorporated herein by reference, in their entirety.

BACKGROUND OF THE INVENTION

1. Field of Invention

This invention relates to determining user interests.

2. Description of Related Art

Conventional search systems allow users to find information by searching for explicitly entered search terms. Relevant documents are typically selected based on the occurrence frequency of the search terms. Term frequency and/or inverse document frequency techniques may be used to identify discriminative terms within a conventional information repository. The discriminative terms are used as indices. Documents are selected for the result set based on matches between the searched terms and indexed terms. As the information in an indexed repository increases, the terms in the index may no longer adequately discriminate between documents in the collection. That is, the large number of index terms result in large numbers of document matches. Kaplan et al. address these problems by allowing a user to pre-select terms and/or concepts of interest. These user-interest terms can then be coupled with a user's specific search terms to inform search engines and/or other information appliances with information about the specific interests of the user. The user-interest terms are then used to identify documents of likely interest to the user.

These conventional systems typically require the development of user-interest profiles to indicating user-interest information. More complicated user-interest profiles typically require skilled knowledge engineers and linguists to work closely with the user to explicitly specify user-interest information. The explicitly specified user-interest information is then transformed into appropriate user-interest terms and parameter weights. However, even when users are capable of directly specifying relevant terms and/or concepts of interest, they are frequently unable to assign the parameter weights necessary for an effective user-interest model. Moreover, conventional search systems do not facilitate dynamically updating the user-interest model as information retrieval patterns change.

Thus, systems and methods for selecting user-interest features and assigning the respective parameter weights of a user-interest model would be useful.

SUMMARY OF THE INVENTION

The systems and methods according to this invention determine parameter weights associated with learned or explicitly identified user-interest features. The user-interest parameter weights are determined manually or may be identified using statistical methods, machine learning and the like. The relevant user-interest features are selected based on explicit information and/or may be dynamically determined based on usage. Explicit information includes user-interest profiles explicitly specifying terms or concepts of interest to the user. User-interest features are dynamically determined by applying statistical techniques and/or machine learning to transaction activities associated with a user. The transaction activities include the user's browsing history, personal document collection and the like. User-interest parameter weights are stochastically determined for the user-interest features and combined with the user interest, into a user-interest model that reflects the user's interests. As the user retrieves new documents, the user-interest model is optionally updated with additional user-interest parameter weights and user-interest features based on the browsing history, the retrieved document and/or other document or activity associated with the user.

DETAILED DESCRIPTION OF EXEMPLARY EMBODIMENTS

Figure 1:
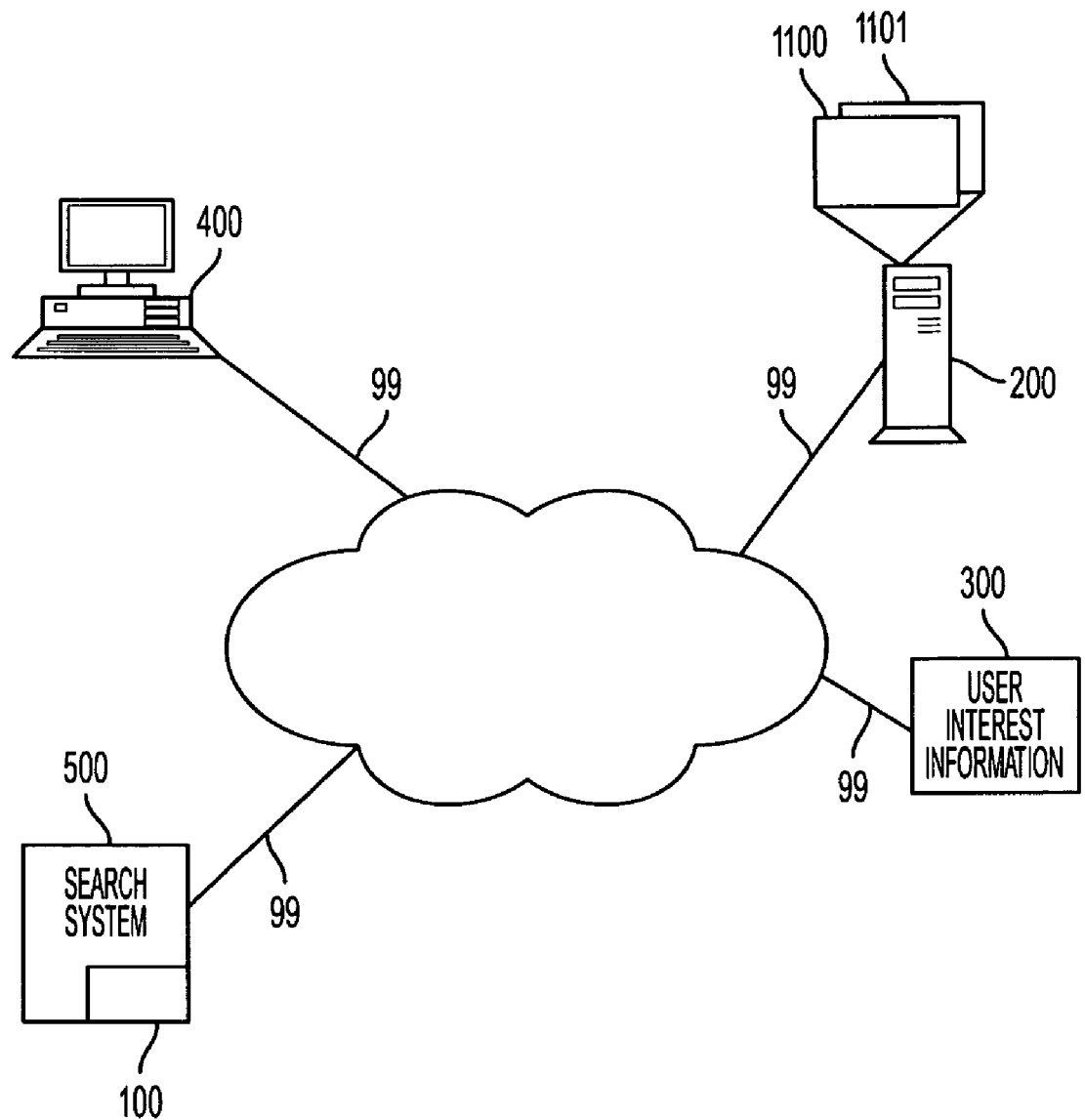
FIG. 1 is an exemplary overview of the use of a system for determining user-interests according to this invention.

FIG. 1 is an exemplary overview of the use of a system for determining user-interests 100 according to this invention. A search system 500 contains an embedded system for determining user interests 100. The search system 500 is connectable via communications links 99 to a communications-enabled personal computer 400, a user-interest information repository 300 and an information repository 200 providing access to documents 1100-1101.

In one exemplary embodiment according to this invention, the user of communications-enabled personal computer 400 initiates a search query of the documents 1100-1101 contained in information repository 200. The query requests documents related to "flowers". The user-interest model is updated to more closely reflect the user's information requirements as the user navigate the documents returned by the search. For example, an initial user query for "flowers" may return documents related to: 1) purchasing retail flower arrangements; 2) purchasing wholesale flowers; and 3) gardening.

The system for determining user interests 100 dynamically learns new user-interest terms and/or updates the terms in the user-interest information repository 300 based on the user navigation of the retrieved collection of documents. Thus, the user's retrieval of multiple documents relating to cultivating orchids is used to update the user-interest information. The weighting for the user-interest feature terms "flowers", "orchids" and "cultivation" are updated or added. Subsequent queries for flowers retrieve documents more focused on the user's interest in flowers, orchids and cultivation.

Figure 2:
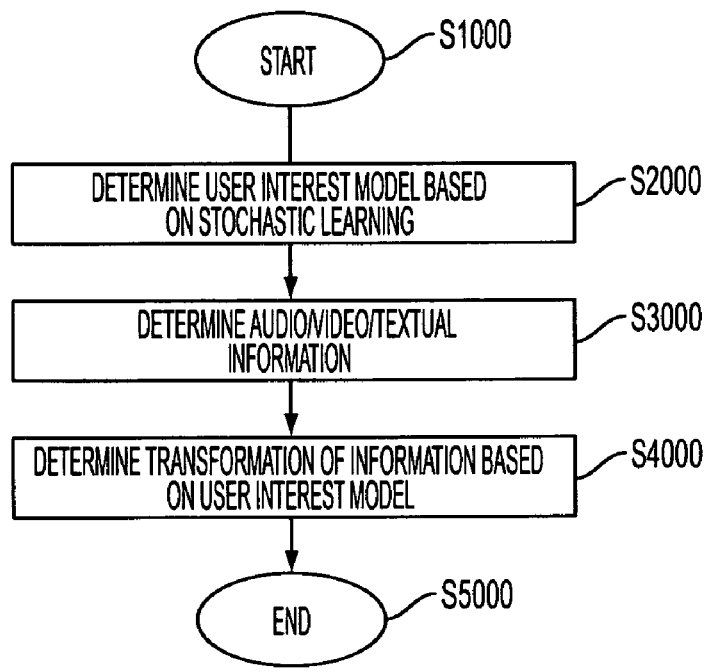
FIG. 2 is a flowchart of an exemplary method of using determined user-interest information according to this invention.

FIG. 2 is a flowchart of an exemplary method of using determined user-interest information according to this invention. The process begins at step S1000 and immediately continues to step S2000.

In step S2000 a user-interest model is determined based on stochastic learning. The stochastic learning is used to select terms or features of interest to the user. The user-interest terms or features are then associated with parameter weights indicating the relative importance of the user-interest feature within the model. For example, assigning a zero-weight to a parameter indicates the irrelevance of the associated feature and effectively discards the user-interest feature from the model. In contrast, a selected user-interest feature is assigned a non-zero parameter weight. The user-interest features and corresponding parameter weights are combined to form a user-interest model.

In various exemplary embodiments according to this invention, the user-interest features and parameter weights are sequentially or simultaneously determined. Methods for combining incremental feature selection and regularization for maximum entropy modeling by a natural incorporation of the regularizer into gradient-based feature selection and associated parameter weight assignments are discussed further in "Incremental Feature Selection and L1 Regularization for Relaxed Maximum-Entropy Modeling" in Proceedings of the 2004 Conference on Empirical Methods in Natural Language Processing, Jul. 25-26, 2004; Barcelona, Spain by S. Riezler and A. Vasserman, herein incorporated by reference in its entirety.

The user-interest model reflects user-interest features and parameter weights associated with the user. In various embodiments, the user-interest features and parameter weights are determined by mining an information repository associated with the user, determining terms in a user-interest profile and/or using various other methods. After the user-interest model has been determined, control continues to step S3000.

In step S3000, audio, video and/or textual information is determined. The audio/video and/or textual information may include documents to be retrieved, condensed, summarized and/or otherwise transformed. In one exemplary embodiment, the audio, video and/or textual information is transformed based on the user-interest model in step S4000. For example, in one exemplary embodiment, a user-interest sensitive condensation is determined for a selected document based on the user-interest model. A user-interest condensation is a text summary that selectively retains elements of the source text based on identified user-interest elements. User-interest sensitive condensation is further discussed in "Systems and Methods for User-Interest Sensitive Condensation" by R. KAPLAN et al., U.S. patent application Ser. No. 10/999,792; herein incorporated by reference in its entirety.

In other exemplary embodiments, the user-interest model is useable to display user-interest sensitive summaries of results found by search. The user-interest sensitive summaries of search results focus attention on salient information more likely to be relevant to the user's information requirements. The salient information is determined based on a user-interest model. It will be apparent that the stochastically determined user-interest models of this invention may be used in a variety of systems and methods requiring information about user interests. After the audio/video and/or textual information has been transformed based on the user-interest model, control continues to step S5000 and the process ends.

Figure 3:
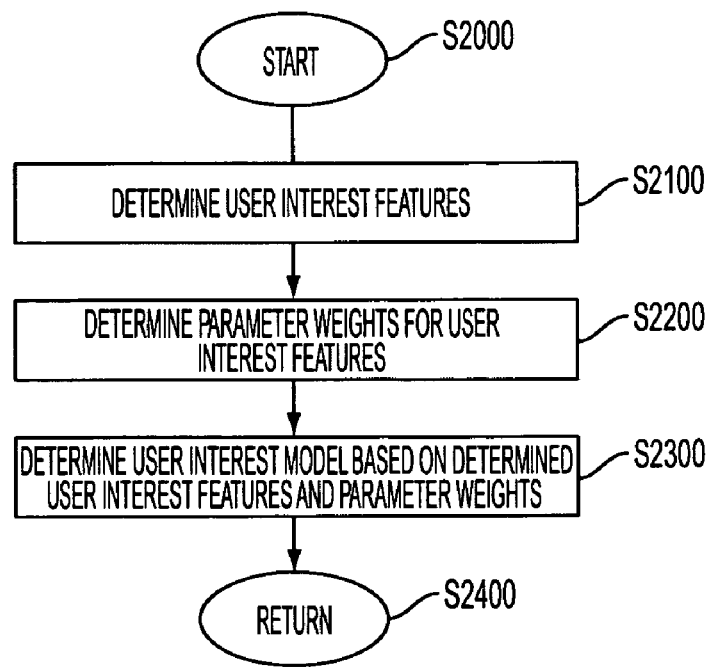
FIG. 3 is an exemplary flowchart of a method of determining a user-interest model according to this invention.

FIG. 3 is an exemplary flowchart of a method of determining a user-interest model according to this invention. The process begins at step S2000 and immediately continues to step S2100.

In step S2100, the user-interest features are determined. The user-interest features include, but are not limited to, the number of interesting words and/or phrases in a training set of interesting documents. In various embodiments, the interesting words and/or phrases are optionally expanded using ontologies, lexicons, thesauri and the like. For example, in one embodiment, the user-interest feature "car" is identified as a tem appearing in a large number of documents associated with the user. Terms related to "car" are identified in the WordNet lexicon. Although the Wordnet lexicon is discussed, it should be apparent that various other lexicons, ontologies thesauri and the like can also be used without departing from the scope of this invention. The related terms may be identified by selecting WordNet terms within a specified number of links of the term "car". Alternately, a parent concept that encompasses the interest word "car" is selected. Other user-interest features may be determined based on the language, genre and/or various other known or later identified characteristics or attributes of the documents. For example, a first user may be interested in "TECHNICAL" genre documents. In contrast, a second user may be interested in documents classified in the "SALES" genre. Feature functions are determined based on the user-interest features. After the user-interest features have been determined, control continues to step S2200.

Parameter weights for the user-interest features are determined in step S2200. In various embodiments according to this invention, the parameter weights are specified in a file or learned. For example, the parameter weights for the user-interest features can be learned from a set of training documents which include terms from the user-interest profile. Thus, training documents containing the user-interest term "car" are identified. The frequency with which the word "car" appears in the documents is determined.

The parameter weights for the "car" user-interest feature are then determined by casting the feature in a log-linear probability model and estimating the associated parameter weight by L1-regularized maximum-entropy estimation from training data. The use of L1-regularized maximum-entropy estimation is discussed further in "Incremental Feature Selection and L1 Regularization for Relaxed Maximum-Entropy Modeling", by Stefan Riezler and Alexander Vasserman, as referenced above. After the parameter weights for the user-interest features have been determined, control continues to step S2300.

In step S2300 user-interest features are combined with the parameter weights to create a user-interest model. In various exemplary embodiments, the user-interest features reflect a count of the number of times the parse, transfer, condensation and/or other transformation functions are applied to a document. Thus, the user-interest features are informed with information about the grammars and rules used to parse, transfer or otherwise transform the user specific training documents and/or other sources of user-interest information. The feature functions representing the identified features and the parameter weights associated with each feature function are combined according to a probability model. In one exemplary embodiment, the features and parameter weights are combined according to a log-linear probability model.

For example, in one exemplary embodiment, stochastic learning of user-interest features and parameter weights is based on training data consisting of pairs of sentences y and gold-standard linguistic structures s. The gold-standard linguistic structures are verified representations of user interests. The objective function is to minimize the negative conditional log-likelihood $L(\lambda)$ of linguistic structures given sentences, modulo a regularization term $R(\lambda)$ on the parameters for training data $\{(sj, yj)\}$, $j=1, \ldots, m$ and the set of possible structures $S(y)$ for each sentence $y_,$. In one exemplary embodiment according to this invention, the following formula:

$$L(\lambda) + R(\lambda) = -\frac{1}{m} \sum_{j=1}^{m} \frac{e^{\lambda \cdot f(sj)}}{\sum_{s \in S(yj)} e^{\lambda \cdot f(sj)}} + \gamma \|\lambda\|_1^1 \quad (1)$$

is optimized using a conjugate gradient optimization that takes advantage of the form of the γ-weighted L1 norm $\gamma\|\lambda\|_1^1$ to perform automatic feature selection that discards noisy and redundant features. The term $f$ reflects feature functions which may include count functions based on transfer functions, parse functions, keep indicators and the like. The stochastic learning is comprised of estimating the parameter weights λ that are associated with the feature functions $f$ according to a log-linear probability model. This use of L1-regularized maximum-entropy estimation is discussed further in "Incremental Feature Selection and L1 Regularization for Relaxed Maximum-Entropy Modeling", by Stefan Riezler and Alexander Vasserman, as referenced above.

The redundant parse, transfer, user-interest and other features are then filtered or removed. The filtered features are then included in the determined probability model. After the user-interest model is determined, control continues to step S2400 and the process returns. Control then immediately continues to step S3000 of FIG. 2.

Figure 4:
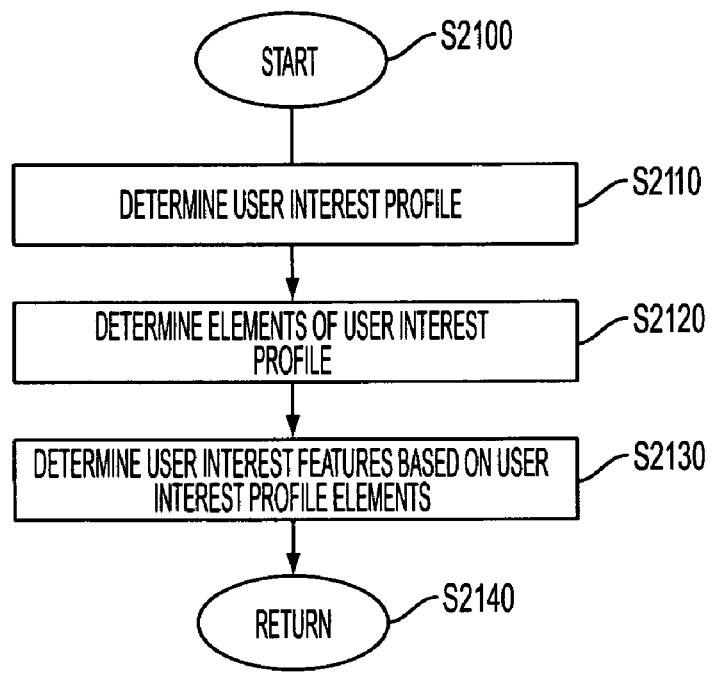
FIG. 4 is a flowchart of an exemplary method for determining user-interest features based on a user-interest profile.

FIG. 4 is a flowchart of an exemplary method for determining user-interest features based on a user-interest profile. The process begins at step S2100 and immediately continues to step S2110.

In step S2110, the user-interest profile is determined. The user-interest profile is read from a file, entered at the keyboard, recognized from speech and/or determined using any other known or later developed input method. After the user-interest profile has been determined, control continues to step S2120.

The elements in the user-interest profile are determined in step S2120. The elements may include, but are not limited to, discrete words or phrases, entries in an ontology, a thesaurus, a lexicon or the like. Single word elements, such as "car", are optionally expanded to include parent and/or sibling concepts. The parent and/or sibling concepts may be retrieved from an ontology, a lexicon and/or any other conceptual mapping. Thus, "car" is optionally expanded to include "automobiles", "carriages", "wagons" and the like. In still other embodiments a parent concept such as "conveyance" is selected. After the elements of the user-interest profile have been determined, control continues to step S2130.

In step S2130, the user-interest features are determined based on the elements of the user-interest profile. Thus, in one exemplary embodiment, the "automobile" "auto" and "car" user-interest features are determined based on the user-interest profile element "car". In this way, conceptually similar elements are easily integrated. After the user-interest features have been determined, control continues to step S2140, the process returns and immediately continues to step S2200 of FIG. 3.

Figure 5:
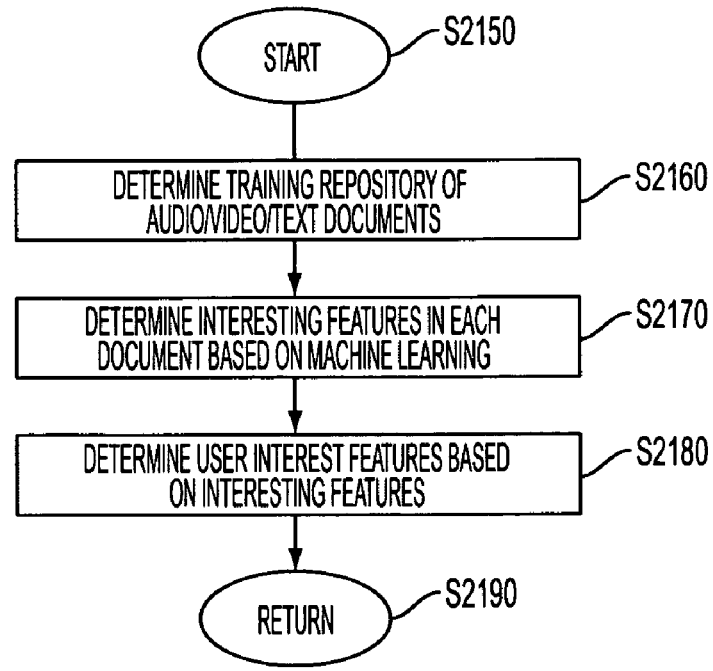
FIG. 5 is a flowchart of an exemplary method for determining user-interest features based on training.

FIG. 5 is a flowchart of an exemplary method for determining user-interest features based on training. The process begins at step S2150 and immediately continues to step S2160.

In step S2160, a training repository of audio/video and/or textual documents is determined. The repository of training documents reflects information of interest to the user. The training repository includes, but is not limited to, documents browsed by the user, email messages, attachments and/or any other type of document or activity associated with the user. After the training repository has been determined, control continues to step S2170.

Interesting information in each document is determined in step S2170. The interesting information is determined implicitly or explicitly. For example, implicitly interesting information is determined based on tracking eye-movements over words in the documents, measuring cursor dwell time over a word or phrase or the like. Explicit determinations of interesting information include user highlighting, entry into an input field or the like. In one embodiment, interesting information in a document is determined by clustering a class of predicates in the document. Although identifying and clustering named entities in a document is useful in identifying interesting information, it will be apparent that any means of determining interesting document information can be used in the practice of this invention. After the interesting information has been determined, control continues to step S2180.

In step S2180, the user-interest features are determined based on the interesting information identified in the repository of training documents. The user-interest features are typically conceptual descriptions of the determined interesting information. For example, if the interesting information is determined to include the term "Toyota Prius" and "Honda Insight", the user-interest features may include the term "hybrid-electric car" as a concept encompassing both interesting information items. Similarly, the specific user-interest information "cup"; "mug"; and "box" may be represented by the conceptual abstraction "container".

In various exemplary embodiments, a conceptual abstraction process is initiated. The conceptual abstraction process locates the elements of user-interest information in a hierarchical ontology or lexicon. Hierarchical lexicons and ontologies include but are not limited to WordNet, Cy, the Suggested Upper Merged Ontology (SUMO) and the like.

The first common parent node in the hierarchical ontology or lexicon reflects the conceptual abstraction for the group of user-interest elements. The first common parent node is selected as the user-interest feature representative of the specific user-interest information elements. After the user-interest features have been determined, control continues to step S2190 and the process returns and immediately continues to step S2200 of FIG. 3.

Figure 6:
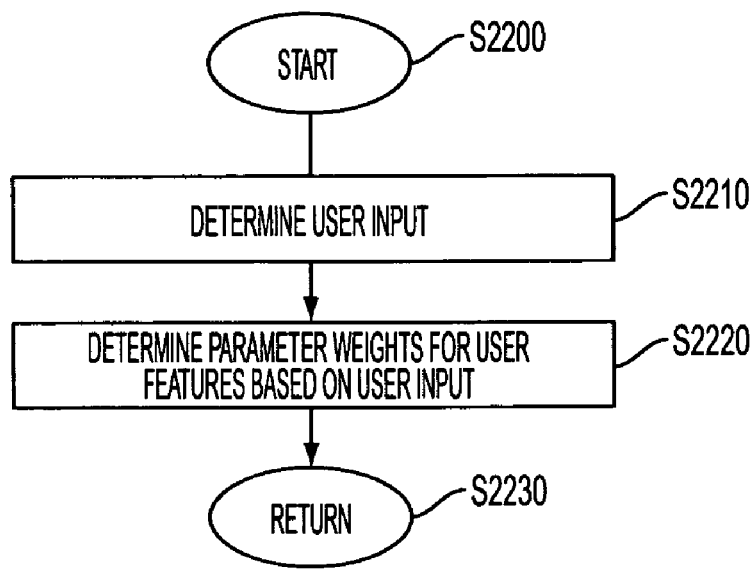
FIG. 6 is a flowchart of an exemplary method of manually determining parameter weights according to this invention.

FIG. 6 is a flowchart of an exemplary method of manually determining parameter weights according to this invention. The process begins at step S2200 and immediately continues to step S2210.

In step S2210, user input is determined. The user input is obtained from a keyboard, retrieved from a file and/or entered using any known or later developed input method. After the user input has been determined, control continues to step S2220.

The parameter weights for user-interest features are determined based on user input in step S2220. In one exemplary embodiment, the parameter weights entered by the user are normalized to a value between 0 and 1. Normalized values are then associated with the relevant feature parameter weight. The parameter weights reflect the degree to which the associated user-interest feature affects the user-interest model. After the parameter weights for the user-interest features have been determined, control continues to step S2230 and the process returns and immediately continues to step S2300 of FIG. 3.

Figure 7:
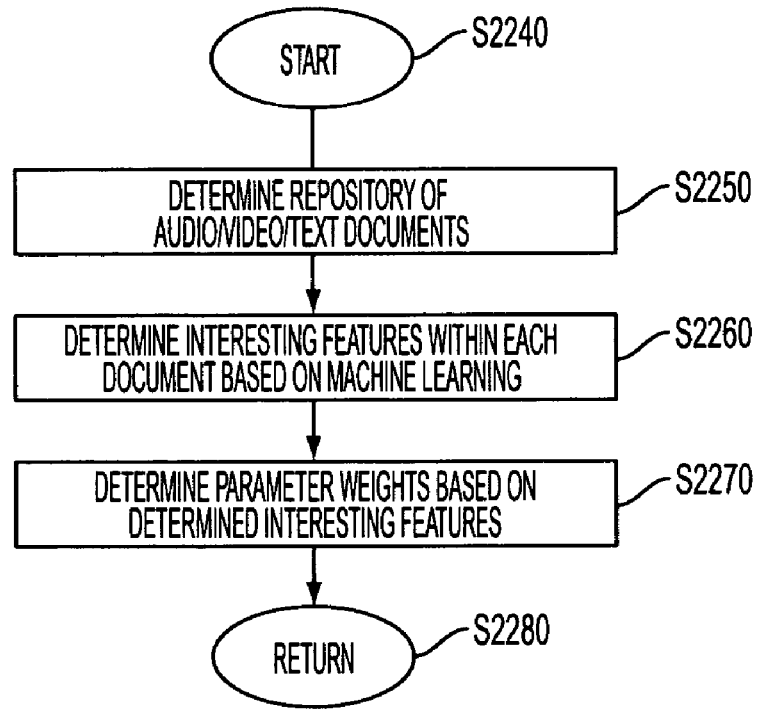
FIG. 7 is a flowchart of an exemplary method of training parameter weights according to this invention.

FIG. 7 is a flowchart of an exemplary method of training parameter weights according to this invention. The process begins at step S2240 and immediately continues to step S2250.

In step S2250, a repository of audio/video/textual documents is determined. The repository of documents may include, but are not limited to word processing documents, email messages, attachments, PDF files, RAM, AVI, JPEG, MJPEG, MPEG and/or any known or later developed document capable of storing audio/video and/or textual information. After the information repository has been determined, control continues to step S2260.

The interesting features within each document are determined in step S2260. The interesting features are determined using machine learning, statistical analysis and/or any known or later developed method of identifying interesting information. User-interest features are then determined based on the interesting features. After the interesting features have been determined, control continues to step S2270.

In step S2270, the parameter weights for each user-interest feature are determined using stochastic learning techniques. After the parameter weights have been determined, control continues to step S2280. The process returns and immediately continues to step S2300 of FIG. 3.

Figure 8:
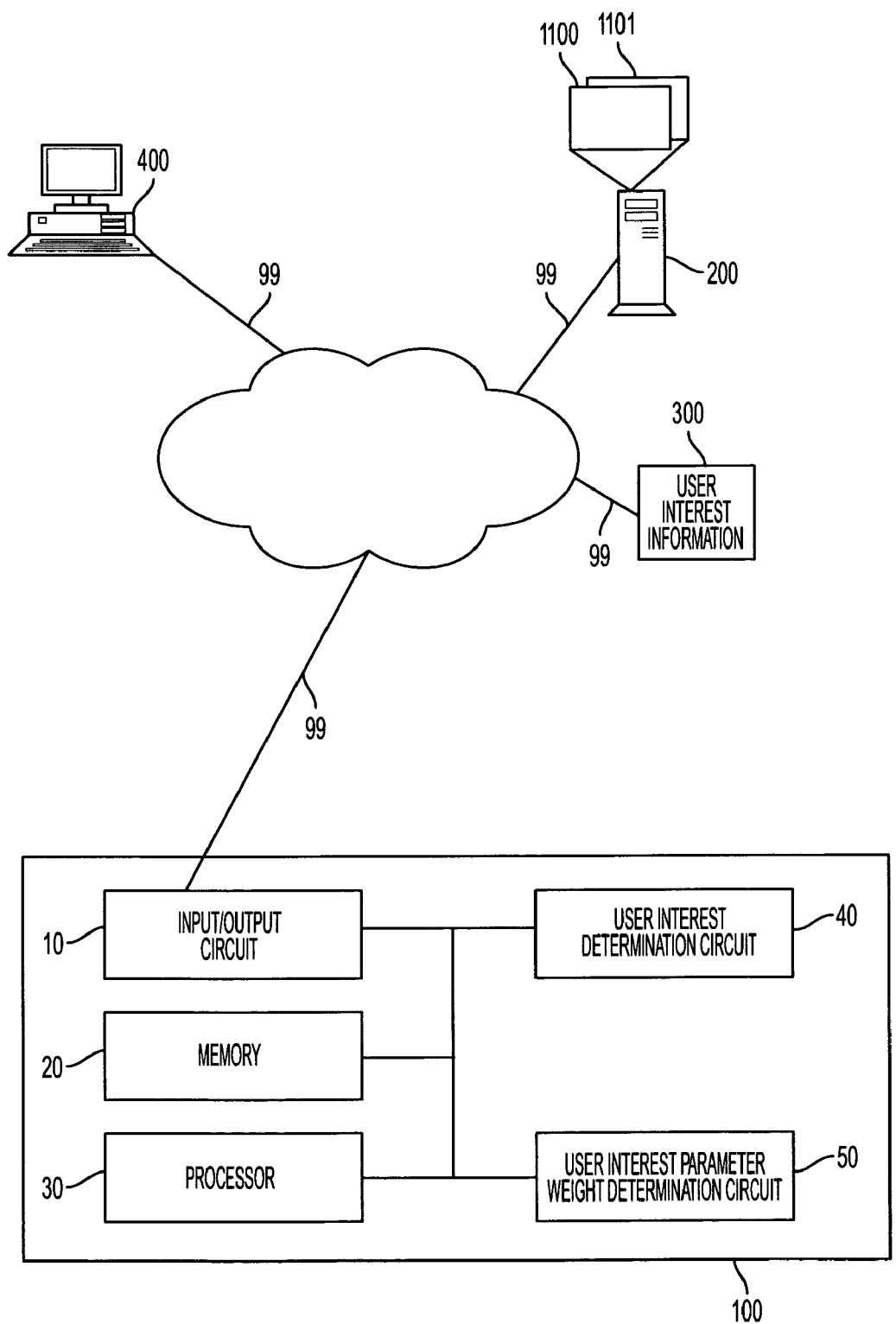
FIG. 8 is an exemplary system for determining a user-interest model 100 according to this invention.

FIG. 8 is an exemplary system for determining a user-interest model 100 according to this invention. The system for determining a user-interest model 100 is connected via communications link 99 to: a user-interest information repository 300; a communications enabled personal computer 400; a search system 500; and an information repository 200 providing access to documents 1100-1101.

The user of communications-enabled personal computer 400 initiates a query requesting a search of documents 1100-1101 contained in the information repository 200. The search query is received by the input/output circuit 10 of the system for determining a user-interest model 100. The system for determining a user-interest model 100 mediates user access to the document results.

The system for determining a user-interest model 100 retrieves any user-interest model associated with the user of the communication-enabled personal computer 400 from the user-interest information repository 300. New users for which a user-interest model has not yet been determined are assigned a null or empty user-interest model. Otherwise the current user-interest model describing the concepts of interest to the user is retrieved.

The system for determining a user-interest model 100 then formulates a search based on the terms of the search query and the terms of the retrieved user-interest model. The formulated search is then forwarded over the communications links 99 to the search system 500. It will be apparent that in various other exemplary embodiments according to this invention, the system for determining a user-interest model 100 is embedded within the search system 500 and/or placed at any location accessible via communications links 99. The search system 500 retrieves the documents matching the formulated search from the information repository 200. The documents in the result set are forwarded to the system for determining a user-interest model 100. The input/output circuit 10 of the system for determining a user model 100 receives the result set of the query. The processor 30 activates the user-interest determination circuit 40 to determine and/or update user-interest features. The processor then activates the user-interest parameter weight determination circuit 50 to determine and/or update parameter weights associated with the user-interest features.

In various exemplary embodiments, the user-interest features and/or parameter weights are retrieved from a file and/or stochastically learned from a set of training documents. For example, in one embodiment according to this invention, the processor 30 activates the user-interest determination circuit 40 to learn user-interest features by analyzing documents associated with the user. The documents may reflect the browsing history of the user, the user's resume and the like. In still other embodiments according to this invention, the user-interest features are retrieved from a file previously entered by the user.

The processor then activates the user-interest parameter weight determination circuit 50 to determine the parameter weight. The parameter weights are learned from a corpus of training documents or retrieved from a previously entered file. For example, in one exemplary embodiment according to this invention, stochastic learning of user-interest features and parameter weights is used. The stochastic learning uses training data consisting of pairs of sentences y and gold-standard linguistic structures s. The verified or gold-standard linguistic structures are representations of user interest. The objective function is to minimize the negative conditional log-likelihood $L(\lambda)$ of linguistic structures given sentences, modulo a regularization term $R(\lambda)$ on the parameters for training data $\{(sj, yj)\}$, $j=1, \ldots, m$ and the set of possible structures $S(y)$ for each sentence $y_i$. Thus, the formula:

$$L(\lambda) + R(\lambda) = -\frac{1}{m}\sum_{j=1}^{m}\frac{e^{\lambda \cdot f(sj)}}{\sum_{s \in S(yj)} e^{\lambda \cdot f(sj)}} + \gamma \|\lambda\|_1^1 \quad (2)$$

is optimized using a conjugate gradient optimization that takes advantage of the form of the $\gamma$-weighted L1 norm $\gamma\|\lambda\|_1^1$ to perform automatic feature selection that discards noisy and redundant features. The term $f$ reflects feature functions which may include count functions based on transfer functions, parse functions, keep indicators and the like. The stochastic learning is comprised of estimating the parameter weights $\lambda$ that are associated with the feature functions $f$ according to a log-linear probability model. This use of L1-regularized maximum-entropy estimation is discussed further in "Incremental Feature Selection and L1 Regularization for Relaxed Maximum-Entropy Modeling", by Stefan Riezler and Alexander Vasserman, as referenced above.

The processor 30 then updates the user-interest model based on the determined features and parameter weights. The user-interest model is optionally saved to the user-interest information repository 300.

In one example, the initial search query requests documents related to "flowers". The user-interest model is dynamically updated to more closely reflect the user's information requirements as the user navigate the documents returned by the search. For example, an initial user query for "flowers" may return documents related to: 1) purchasing retail flower arrangements; 2) purchasing wholesale flowers; and 3) gardening.

The system for determining user interests 100 dynamically learns new user-interest terms and/or updates the terms in the user-interest information repository 300 based on the user navigation of the retrieved collection of documents. Thus, the user's retrieval of multiple documents relating to cultivating orchids is used to update the user-interest information. The weighting for the user-interest feature terms "flowers", "orchids" and "cultivation" are updated or added to the user-interest model. Subsequent queries for flowers retrieve documents more focused on the user's interest in flowers, orchids and cultivation.

Figure 9:
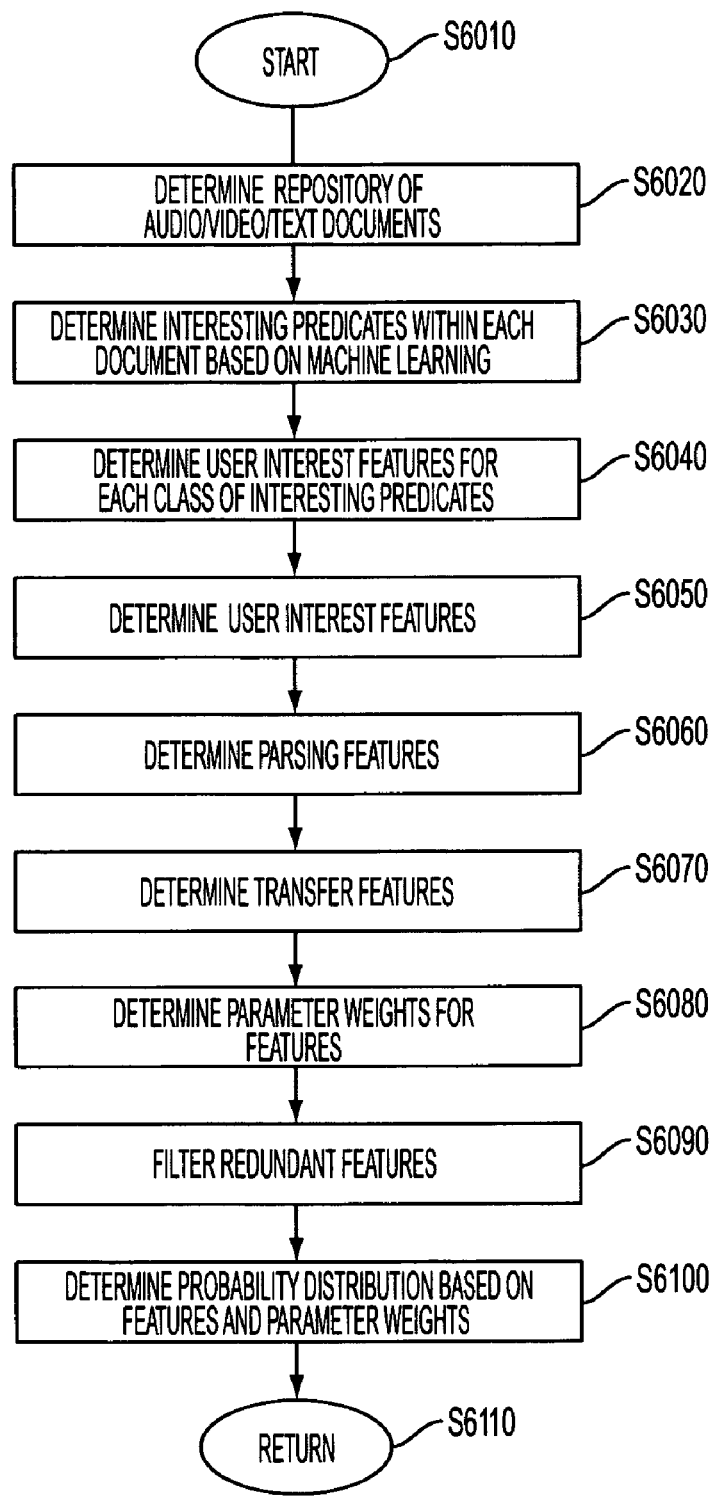
FIG. 9 is a flowchart of an exemplary method of determining a user-interest model according to this invention.

FIG. 9 is a flowchart of an exemplary method of determining a user-interest model according to this invention. The process begins at step S6010 and immediately continues to step S6020.

In step S6020, a repository of audio/video and/or textual documents is determined. The documents reflect the interests of the user. Thus, in one exemplary embodiment, the document repository contains documents associated with the user's browsing history, a resume, email and/or various other documents associated with the user. In various other embodiments, the repository of audio/visual and/or textual documents form a subset of a larger repository of documents associated with a specific user. For example, the organization's proxy server is typically configured to retain access logs. The access logs comprise universal resource locators (URLs) and user identifiers indicating the pages/documents accessed under each user identifier. The subset of access records for a specific user form a repository of audio/video and/or textual documents associated with the user. After the repository of documents has been determined, control continues to step S6030.

Interesting predicates for each document in the repository are determined in step S6030. In one embodiment, interesting predicates are determined by identifying a class of possibly interesting predicates. For example, named entities are usually associated with the important or salient document information. Therefore, potentially interesting predicates are also likely to contain named entities. It will be apparent that other classes of predicates and/or methods of determining interesting predicates may be used without departing from the scope of this invention. After the interesting predicates have been determined, control continues to step S6040 where user-interest features for each class of interesting predicates are determined.

In one exemplary embodiment, clustering methods are applied to the determined interesting predicates. Ontologies or lexicons are optionally used to determine conceptual abstractions or relationships between the clusters of interesting predicates. After the relationships or associations have been determined, control continues to step S6050 where user-interest features are determined.

Identifying user-interest features are determined for each conceptual abstraction. The identifying user-interest features reflect information useful in classifying a document into one of the identified conceptual abstractions. After the identifying user-interest features have been determined, control continues to step S6060.

In step S6060, the parsing features are determined. The parsing features may include, but are not limited to, count functions associated with the type and number of parsing, rules applied to the information in the document. The parsing features will vary based on the specific parsing grammar used in the embodiment. For example, a first set of count functions is determined for a Lexical Functional Grammar based parser. A second set of count functions may be defined for a Head-Driven-Phrase Structure Grammar based parser and/or various other types of grammars. After the parsing features have been determined, control continues to step S6070.

The transfer features are determined in step S6070. In various embodiments, the transfer features are associated with a count of the number of times a transfer function is applied to the document. It will be apparent that the transfer features depend on the type of applied transfer rules. Thus, the history of transfer functions applied to a text structure is optionally maintained in a transfer history structure. The transfer rule history structure facilitates the determination of transfer features such as count functions on the application of the transfer rules. After the transfer features have been determined, control continues to step S6080.

In step S6080, the parameter weights for the features are determined. In various exemplary embodiments according to this invention, the weights for the features are determined using L1-regularized maximum-entropy estimation as described in "Incremental Feature Selection and L1 Regularization for Relaxed Maximum-Entropy Modeling", by Stefan Riezler and Alexander Vasserman, referenced above. However, it will be apparent that various other means of feature weight determination may also be used without departing from the scope of the invention. After the weights for the features have been determined, control continues to step S6090.

The redundant features are filtered in step S6090. The set of user-interest features, transfer features and parsing features may include duplicate entries. The duplicate entries are therefore filtered or removed. The resulting set of filtered features form the set of features for the user-interest model. After the redundant features are determined, control continues to step S6100.

A probability distribution is determined based on the features and the parameter weights in step S6100. For example, in one embodiment, the features and parameter weights are combined in a log-linear probability distribution to create the user-interest model. After the user-interest model has been determined, control continues to step S6110 and returns. Control then immediately continues to step S3000 of FIG. 2.

Figure 10:
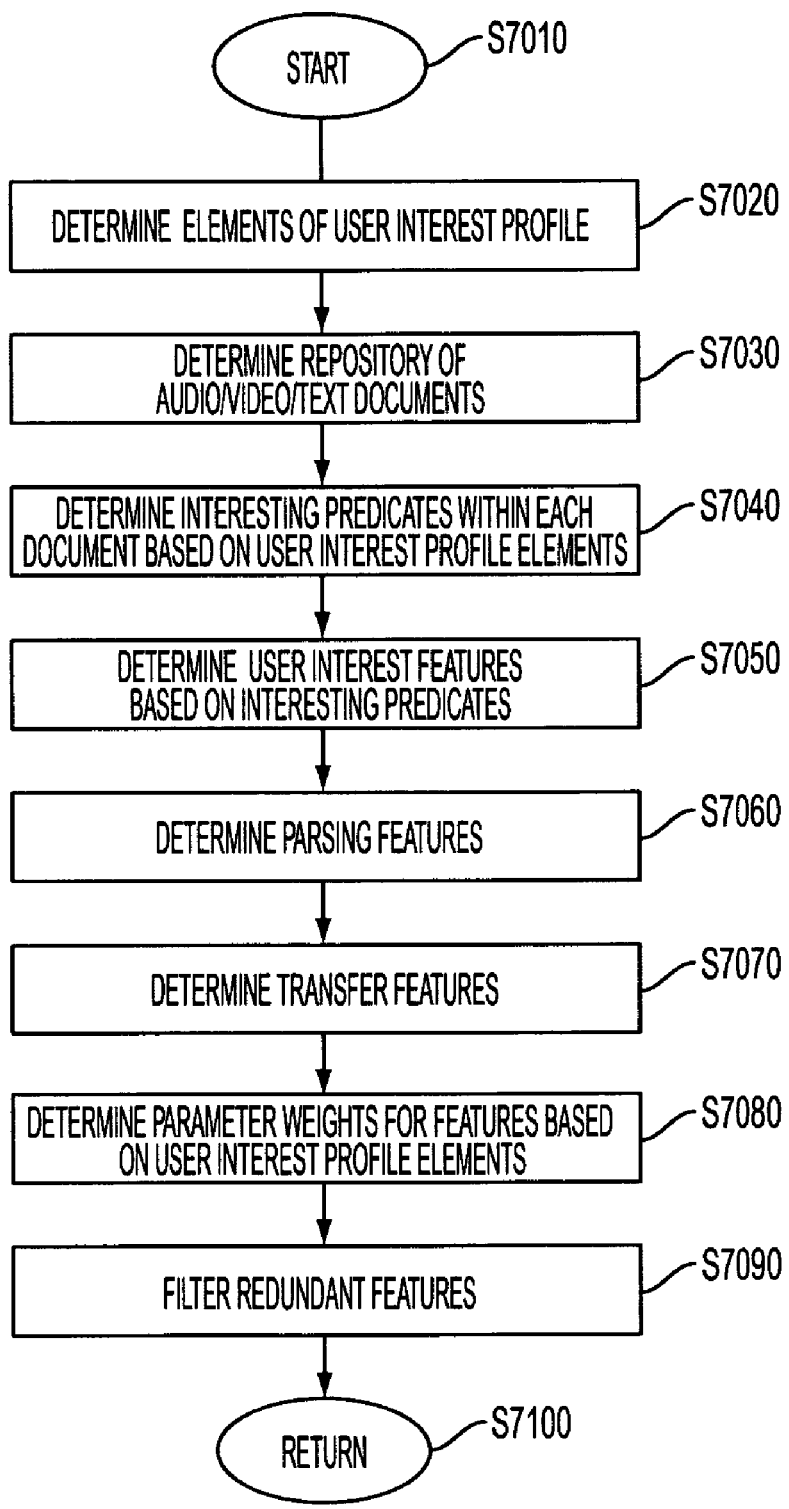
FIG. 10 is an exemplary method of determining a user-interest model according to this invention.

FIG. 10 is an exemplary method of determining a user-interest model according to this invention. The process begins at step S7010 and immediately continues to step S7020.

In step S7020, the elements of the userinterest profile are determined. In one exemplary embodiment according to this invention, the user-interest profile for a user is retrieved from a file. However, it will be apparent that in other embodiments, the user-interest profile elements are dynamically entered using keyboard, an automatic speech recognizer and/or any other known or later developed input method. Control then continues to step S7030.

An information repository containing audio/video and/or textual documents associated with the user is determined in step S7030. The information repository can be a web server serving hyper text markup language encoded documents, a digital library, a document archive, a document management system and/or any other known or later developed information source. After the information repository has been determined, control continues to step S7040.

In step S7040, the interesting predicates in each document in the repository are determined. In various embodiments, the interesting predicates are identified by matching user-interest profile elements to elements in the document. Thus, predicates associated with the user-interest profile element "car" are optionally expanded using a ontology, a lexicon, a thesaurus and the like. The expanded user-interest profile element is then matched against the document elements. The document elements include words, predicates or other text structures. Thus, the user-interest profile element "car" is expanded conceptually to match conceptually similar document elements such as "automobile", "autocar" and the like. Conceptual matching of user-interest profile elements is further discussed in co-pending, co-assigned U.S. patent application Ser. Nos. 10/999,792 and 10/999,793 to R. Kaplan et al. herein incorporated by reference in its entirety. After the interesting predicates have been determined, control continues to step S7050

In step S7050, the user-interest features are determined based on the interesting predicates. In one embodiment according to this invention, the user-interest features are determined based on the frequency with which interesting predicates occur in the documents. After the user-interest features have been determined, control continues to step S7060.

The parsing features are determined in step S7060. In various embodiments, the parsing features are determined based on how parsing rules are applied to the documents. For example, a parsing rule log may be used to indicate the type of parsing rule applied to given document structures. Count functions are defined on the application of the parsing rules. Count function parsing features are determined by analyzing the parsing rule log. Alternatively, the count functions based on parsing rules are determined during the parsing. After the count function and other parsing features have been determined, control continues to step S7070.

In step S7070, the transfer features for the documents are determined. In various exemplary embodiments according to this invention, the transfer features are determined based on how the transfer rules are applied to the documents. Thus, a transfer rule log is used to indicate the number and type of transfer rules applied to a given document structure. Count functions on the application of the transfer rules are determined from the transfer rule log. After determining the count function and other transfer features, control continues to step S7080 where parameter weights are determined.

The parameter weights are determined using a stochastic learning method such as L1-regularized maximum-entropy estimation as described in "Incremental Feature Selection and L1 Regularization for Relaxed Maximum-Entropy Modeling", by Stefan Riezler and Alexander Vasserman, referenced above. The parameter weights are determined using user-interest profile elements. After the parameter weights have been determined, control continues to step S7090.

In step S7090, redundant user-interest, parsing and transfer features are eliminated. In various embodiments, the elimination of redundant user-interest, transfer and parsing features is performed by feature selection which is part of L1-regularized maximum-entropy estimation or other feature selection techniques. After the redundant features have been removed, control continues to step S7100 and immediately continues to step S3000 of FIG. 2.

Figure 11:
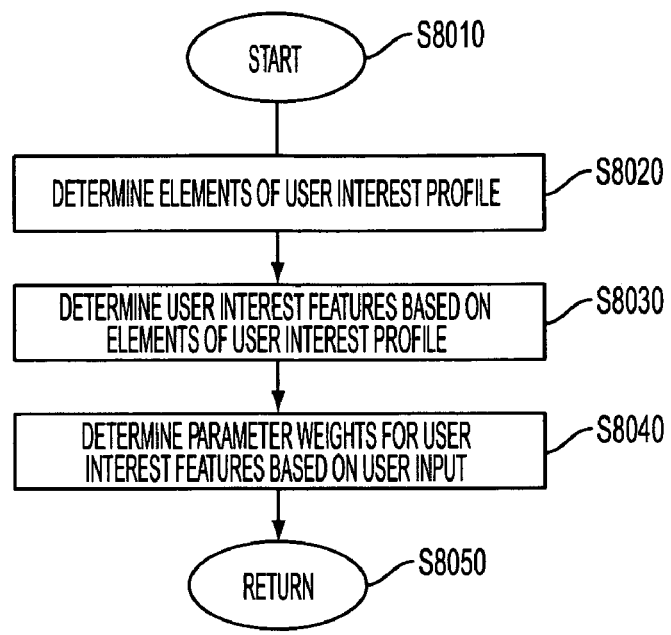
FIG. 11 is a flowchart of a first exemplary method of determining parameter weights for a user-interest model according to this invention.

FIG. 11 is a flowchart of a first exemplary method of determining parameter weights for a user-interest model according to this invention. The process begins at step S8010 and immediately continues to step S8020.

In step S8020, the elements of the user-interest profile are determined. The user-interest profile elements are read from a file, entered at the keyboard, retrieved from a storage medium and/or determined using any other known or later developed input method. After the elements of the user-interest profile have been determined, control continues to step S8030 where the features are determined based on the elements of the user-interest profile.

In various exemplary embodiments, the elements of the user-interest profile are conceptual descriptions. Thus, the "car" and other user-interest profile elements are conceptually expanded to user-interest features that include related concepts such as "automobile". After the features have been determined, control continues to step S8040.

In step S8040, user input is accepted and associated with the parameter weights of each determined feature. In one embodiment, the parameter weights are normalized values ranging from 0 to 1. However, any consistent range of values may be used without departing from the scope of this invention. After the user input has been assigned to the parameter weights, control continues to step S8050 and immediately continues to step S3000 of FIG. 2.

Figure 12:
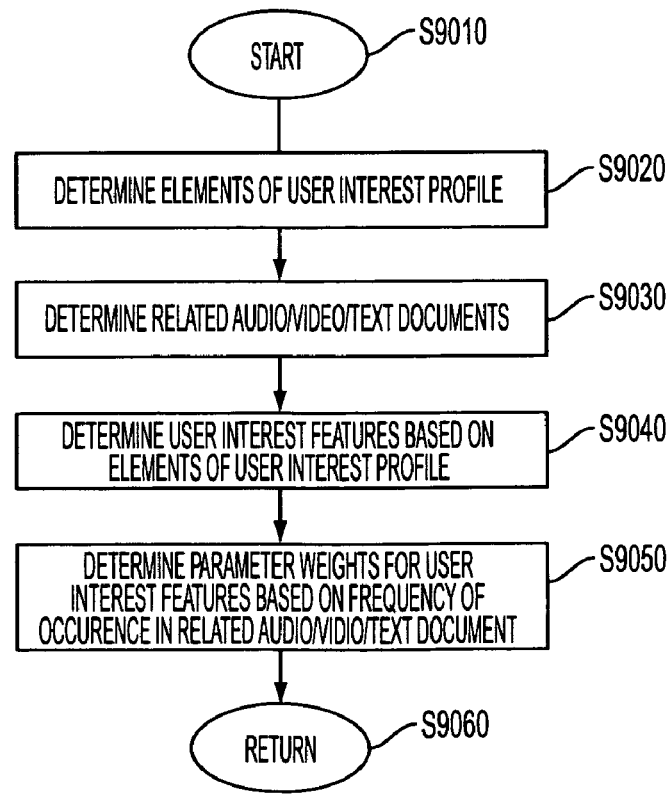
FIG. 12 is a flowchart of a second exemplary method of determining parameter weights for a user-interest model according to this invention.

FIG. 12 is a flowchart of a second exemplary method of determining parameter weights for a user-interest model according to this invention. The process begins at step S9010 and immediately continues to step S9020.

In step S9020, the elements of the user-interest profile are determined. The elements of the user-interest profile are read from a file, dynamically entered by the user and/or determined using any other known or later developed method. After the elements of the user-interest profile have been determined, control continues to step S9030.

One or more topically related audio/visual or textual documents are determined in step S9030. For example, in one exemplary embodiment, the headings of the user's web site are scanned for user-interest profile elements. Documents classified under the list headings are retrieved. The retrieved documents are analyzed and terms are identified. One or more of the terms are then associated with the user-interest profile as topically related. After the one or more topically related documents have been determined, control continues to step S9040.

In step S9040, user-interest features are determined based on the presence of user-interest elements in the topically related documents. For example, in one embodiment, a user-interest feature indicates the number of hierarchical links between the user-interest profile element "car" and the word "automobile" or "autocar" found in the topically related document. It will be apparent that various other user-interest features may be used without departing from the scope of this invention. After the user-interest features have been determined, control continues to step S9050 where the parameter weights for the user-interest features are estimated.

In one exemplary embodiment, the frequency of occurrence of an element and/or conceptually related term is used as an estimate of the parameter weight for the user-interest feature. After the parameter weights for each user-interest feature have been determined, control continues to step S9060 and immediately continues to step S3000 of FIG. 2.

In the various embodiments of the system for determining user interests 100, each of the circuits 10-50 outlined above can be implemented as portions of a suitably programmed general-purpose computer. Alternatively, 10-50 of the system for determining user-interests 100 outlined above can be implemented as physically distinct hardware circuits within an ASIC, or using a FPGA, a PDL, a PLA or a PAL, or using discrete logic elements or discrete circuit elements. The particular form each of the circuits 10-50 of the system for determining user-interests 100 outlined above will take is a design choice and will be obvious and predictable to those skilled in the art.

Moreover, the system for determining user-interests 100 and/or each of the various circuits discussed above can each be implemented as software routines, managers or objects executing on a programmed general purpose computer, a special purpose computer, a microprocessor or the like. In this case, the system for determining user-interests 100 and/or each of the various circuits discussed above can each be implemented as one or more routines embedded in the communications network, as a resource residing on a server, or the like. The system for determining user-interests 100 and the various circuits discussed above can also be implemented by physically incorporating the system for determining user-interests 100 into software and/or hardware system, such as the hardware and software systems of a web server or a client device.

As shown in FIG. 8, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 8 can each be any known or later developed device or system for connecting a communication device to the system for determining user-interests 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. In a computer-based search system configured to receive a search query from a user and, in response to the search query, return documents or links to documents in a repository of documents to the user, a computer-implemented method of determining a user-interest model for the user, comprising the steps of:

determining the repository of documents, the repository of documents comprising at least one of audio, video and textual documents associated with the user;

determining interesting predicates within each of the documents based on machine learning;

determining user-interest features for each class of the interesting predicates, the user-interest features comprising at least one of terms, phrases, and concepts related to the terms or phrases of interest to the user;

determining user-interest identifying features for each conceptual abstraction of the documents;

determining parsing features, the parsing features including at least one of parsing functions and parsing rules;

determining transfer features, wherein the transfer features are associated with a count of the number of times a transfer function is applied to each of the documents;

determining parameter weights for the user-interest features;

filtering redundant features from the user-interest features;

determining a probability distribution based on the user-interest features and the parameter weights;

determining a user-interest model based on the user-interest features and the parameter weights:

casting the user-interest features in a log-linear probability model; and estimating each associated parameter weight using L1-regularized maximum entropy estimation.

2. The method of claim 1, wherein estimating each associated parameter weight comprises estimating the associated parameter weight by L1-regularized maximum-entropy estimation from training data.

3. The method of claim 2, wherein estimating the associated parameter weight by L1-regularized maximum-entropy estimation from training data comprises:

stochastic learning of the user-interest features and the parameter weights based on training data comprising pairs of sentences y, and linguistic structures s which comprise verified representations of the user-interest features; and minimizing a negative conditional log-likelihood L($\lambda$) of linguistic structures given sentences, modulo a regularization term R($\lambda$) on the parameters for training data $\{(s_j, y_j)\}, j=1, \ldots, m$ and the set of possible structures S(y) for each sentence y.

4. The method of claim 3, wherein minimizing a negative conditional log-likelihood L($\lambda$) of linguistic structures comprises:

optimizing $$L(\lambda) + R(\lambda) = -\frac{1}{m}\sum_{j=1}^{m} \frac{e^{\lambda \cdot f(s_j)}}{\sum_{s \in S(y_j)} e^{\lambda \cdot f(s)}} + \gamma \|\lambda\|_1^1$$

using a conjugate gradient optimization utilizing a form of the $\gamma$-weighted L1 norm $\gamma\|\lambda\|_1^1$ to perform automatic feature selection that discards noisy and redundant features, wherein the term $f$ comprises feature functions which include count functions based on at least one of transfer functions, parse functions, and keep indicators, wherein the stochastic learning comprises estimating the parameter weights $\lambda$ associated with the feature functions $f$ according to the log-linear probability model.

* * * * *